United States Patent [19]

Weber

[11] Patent Number: 4,557,879

[45] Date of Patent: Dec. 10, 1985

[54] GAS DIFFUSER WITH INDEFINITE LIFE AND MIXED BUBBLE SIZE CAPACITY

[75] Inventor: Richard B. Weber, Denver, Colo.

[73] Assignee: Wilfley Weber, Inc., Englewood, Colo.

[21] Appl. No.: 653,842

[22] Filed: Sep. 24, 1984

[51] Int. Cl. ................................................. B01F 3/04
[52] U.S. Cl. ..................................... 261/122; 261/124
[58] Field of Search ................................ 261/122, 124

[56] References Cited

U.S. PATENT DOCUMENTS

| | | | |
|---|---|---|---|
| 803,068 | 10/1905 | Plantinga | 261/122 |
| 2,637,541 | 5/1953 | Rubin | 261/122 |
| 3,424,443 | 1/1969 | Thayer | 261/124 |
| 3,606,985 | 9/1971 | Reed | 261/124 |
| 3,608,834 | 9/1971 | MacLaren | 261/124 |
| 3,915,862 | 10/1975 | Moloney | 261/122 |
| 3,953,554 | 4/1976 | Loughridge | 261/122 |
| 4,474,714 | 10/1984 | Downs | 261/124 |

FOREIGN PATENT DOCUMENTS

| | | | |
|---|---|---|---|
| 1029754 | 5/1958 | Austria | 261/122 |
| 199570 | 9/1958 | Austria | 261/122 |

Primary Examiner—Tim Miles
Attorney, Agent, or Firm—Clement and Ryan

[57] ABSTRACT

A diffuser for dispersing gas into a body of liquid that may contain suspended solids. Under ordinary clogging conditions, the diffuser will remain operative over an indefinite period of time by reason of large gas outlet openings at the bottom of the gas plenum chamber. In addition, it can be employed for a good portion of that time to disperse a substantial flow of coarse bubbles and fine bubbles, in a desired combination, simultaneously from a single gas plenum. Careful selection of the permeability and area of a top porous wall of a gas plenum chamber, together with proper selection of the level, size and number of coarse bubble gas outlet openings in the side walls of the plenum chamber, achieve the second feature.

12 Claims, 3 Drawing Figures

U.S. Patent     Dec. 10, 1985     4,557,879
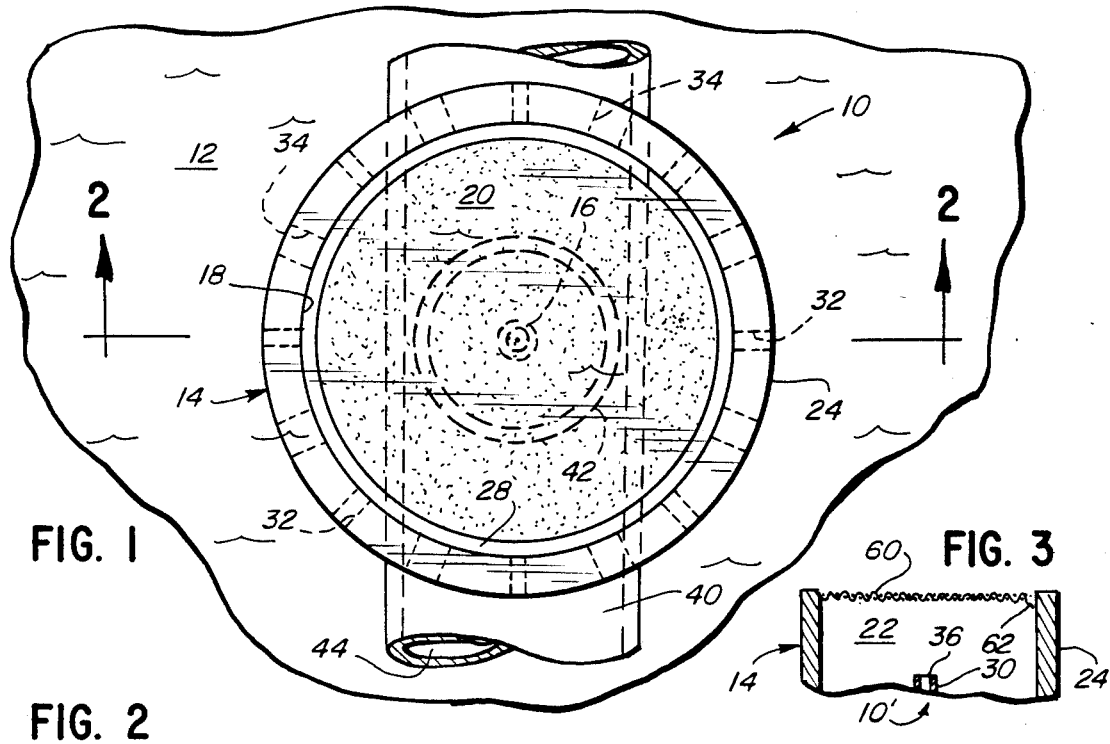
FIG. 1
FIG. 3
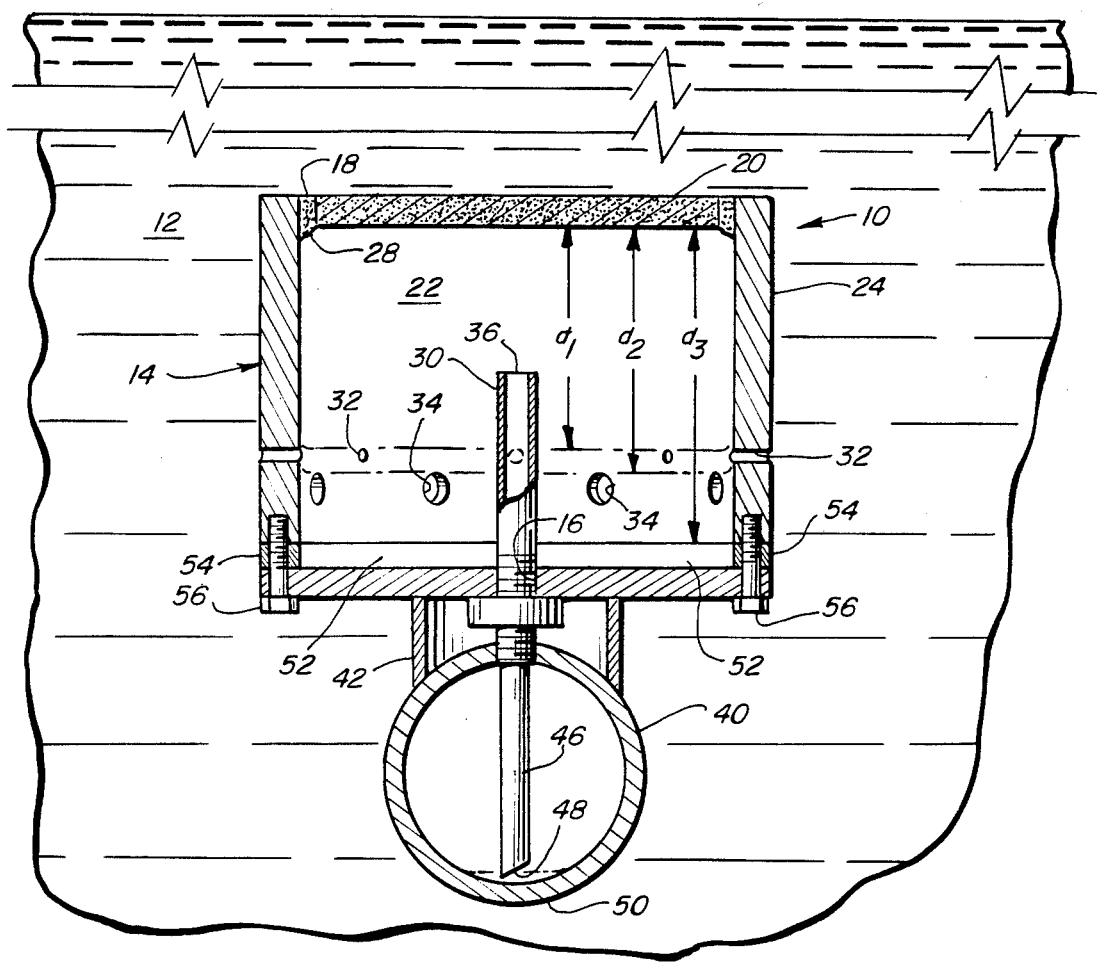
FIG. 2

GAS DIFFUSER WITH INDEFINITE LIFE AND MIXED BUBBLE SIZE CAPACITY

This invention relates to a diffuser for dispersing gas into a body of liquid that may contain suspended solids, and in particular such a diffuser that under ordinary clogging conditions will remain operative over an indefinite period of time, and in addition can be employed for a good portion of that time to disperse a substantial flow of both coarse bubbles and fine bubbles, in a desired combination, simultaneously from a single gas plenum.

BACKGROUND OF THE INVENTION

During use of any gas diffuser that is operated while submerged in a body of liquid that may contain suspended solids, such as waste water, eventual clogging of all outlet openings below a certain size in the walls of the gas plenum chamber of the diffuser is unavoidable because of dirt in the gas (such as air) that is pumped through the diffuser, the settling out of solid particles of various types that are suspended in the liquid, and the formation of deposits of iron or calcium compounds or other similar compounds. If such a diffuser is used under ordinary conditions of use for a long enough period of time, experience has shown that in some liquids any gas outlet openings that produce gas bubbles that are approximately ⅛" or smaller in diameter are likely to become completely clogged.

Gas diffusers are known that address this problem by providing, in addition to smaller openings, some alternative gas outlet openings that are large enough that they will never become clogged under any likely conditions of use. Thus, gas diffusers for operating in a body of liquid are known that include two groups of gas outlet openings from the gas plenum chamber, the first group being of smaller size and located at a higher level than the second group, with the openings in the second group being horizontal slots large enough that even if the openings in the first group become completely clogged after a long period of use, the larger slots will remain open indefinitely (under any ordinary conditions of use) no matter how long the diffuser remains submerged in the body of liquid into which gas is being introduced. The gas diffuser disclosed in Thayer U.S. Pat. No. 3,424,443 issued Jan. 28, 1969 is one example of such a device.

In the device of the Thayer patent, gas is introduced at the top of the plenum chamber to displace liquid that initially flowed into the plenum from the body of liquid in which the plenum chamber is submerged. After enough gas has accumulated under the impermeable top wall and impermeable upper wall portions of the plenum chamber to lower the surface of the liquid in the chamber to the level of the smaller outlet openings in the side walls of the chamber, the gas flows out through these smaller openings. So long as these smaller openings do not close up completely from the clogging that (as explained above) unavoidably occurs during extended periods of diffuser use, some gas is permitted to exit through the side walls.

The resulting bubbles grow smaller as the openings gradually become more and more clogged. In addition, the Thayer device attempts to decrease the size of the bubbles from the side wall openings by constructing the bottom wall of the gas plenum chamber in a special configuration that is intended to give the upwardly directed liquid currents (resulting from the rising gas bubbles after they are emitted from the side wall openings) a shearing effect as they move upward past the side walls of the chamber.

After the side wall openings of the gas plenum chamber in a device such as the Thayer diffuser have become completely clogged, the pressurized gas enclosed within the plenum beneath the impermeable top wall—and now the impermeable side walls—pushes the surface of the liquid in the lower portions of the plenum chamber down to the level of the horizontal "emergency air release slots" at the bottom of the chamber (col. 2, lines 25-26).

The Thayer invention thus achieves a gas diffuser having an indefinite life through utilization of a gas plenum chamber having an impermeable top and impermeable upper wall portions to produce gas flow on a consecutive basis from the same gas plenum—initially through first, smaller gas outlet openings at a level part way down the side walls of the plenum chamber and after those openings become completely clogged, through second, much larger gas outlet openings in the form of horizontal slots at the bottom of the plenum chamber (col. 1, line 70 to col. 2, line 2; col. 3, lines 43-47).

U.S. Pat. No. 3,608,834 to MacLaren discloses an air diffuser similar to the Thayer device in that it utilizes openings in the side walls of the plenum chamber and notches at the open bottom of the chamber. The plenum chamber of the MacLaren diffuser, like that of the Thayer diffuser, has not only impermeable upper wall portions but also an impermeable top wall (except for an inlet valve that opens to admit air into the plenum chamber during operation of the device), and thus the two diffusers operate basically in much the same way.

In the Thayer and MacLaren difusers, although both air ports 23 and openings 57 spaced above the bottoms of the respective side walls of the diffusers are smaller than longitudinal air escape slots 27 and notches 46 or 56 at the bottom of the side walls, they are still not small enough to produce fine gas bubbles as defined below in this specification. Furthermore, even if they were small enough, the bubbles emitted from Thayer ports 23 and MacLaren upper openings 57 are formed only in single narrow zones along the perimeters of the respective gas diffusers, which zones are defined by the side walls of the plenum chambers, instead of across the entire porous area of the top wall of the diffuser, as is the case with the present invention.

SUMMARY OF THE INVENTION

Simultaneous Production From Single Gas Plenum Of Desired Mix Of Fine And Coarse Bubbles Applicant has unexpectedly discovered that it is not necessary to make the top wall of the gas plenum impermeable as Thayer and MacLaren do but, on the contrary, there are definite advantages to making the top wall permeable if its permeability is carefully selected and certain additional gas outlet openings of a larger size are employed at a carefully selected level part way down the side walls of the gas plenum chamber. Specifically, if (1) the permeability of the top wall of the gas plenum chamber is properly selected to produce fine gas bubbles (as defined below in this specification), and (2) small gas outlet openings are positioned in the plenum chamber side walls at the proper level below the porous top wall of the chamber, it is possible during a substantial portion of the life of the diffuser to achieve simultaneous production of a desired "mix" or proportions of fine bubbles and coarse bubbles (as defined below in this specification) from a single gas plenum.

Applicant has further discovered that if the two parameters mentioned above (permeability of top wall and level of gas outlet openings in side walls) are properly selected, the particular ratio of the quantity of fine bubbles to the quantity of coarse bubbles that is appropriate for the application for which the diffuser is to be used can be achieved during the first period of diffuser use, and thereafter roughly maintained so long as the porous material and other gas outlet openings from the gas plenum chamber do not become clogged at rates that are too sharply different from each other.

Desired Proportions Of Fine And Coarse Bubbles

As is well known, fine gas bubbles achieve a higher gas transfer rate in the liquid into which they are introduced than can be achieved with larger bubbles. On the other hand, coarse gas bubbles have the advantage of achieving a greater mixing effect by helping to keep any solid particles that are suspended in the body of liquid in suspension.

Many diffusers are known that disperse fine gas bubbles into a body of liquid in which they are immersed. Similarly, many diffusers are known for the production and dispersion of coarse gas bubbles into a body of liquid in which those diffusers are immersed. So far as is known to applicant, however, before the present invention there has never been a diffuser device that simultaneously produces and disperses from a single gas plenum gas bubbles both fine and coarse in size as defined in this specification.

Since applicant has discovered unexpectedly that his invention makes it possible to produce a substantial quantity of fine bubbles and a substantial quantity of coarse bubbles simultaneously and in desired proportions from a single gas plenum, this invention makes available at one and the same time the above described advantages of both fine bubble diffusion and coarse bubble diffusion, with a substantial savings in equipment costs by reason of the fact that only a single plenum is required for both functions.

Because of the respective advantages of a flow of fine gas bubbles and a flow of coarse gas bubbles, and the accompanying disadvantage with fine bubbles of a low gas flow rate and resulting low gas transfer efficiency, a different "mix" or different proportions of fine and coarse bubbles sizes is preferred for various uses to which a gas diffuser is put. In standard waste water treatment such as in a sewage treatment plant, for example, a good balance is believed to be approximately 80 percent by flow rate of fine air bubbles and approximately 20 percent by flow rate of coarse air bubbles. In an aeration channel, in which a greater mixing action is required, it is believed that a good balance is approximately 50 percent by flow rate of fine air bubbles and approximately 50 percent by flow rate of coarse air bubbles. For other applications, the mixture of fine and coarse bubbles that is desired will be determined by the respective requirements (known to those skilled in the art) as to gas transfer efficiency and mixing that are presented by the applications in question.

No gas diffusers prior to the device of the present invention that are known to applicant could achieve not only simultaneous production from a single gas plenum of a substantial quantity of fine gas bubbles and a substantial quantity of coarse gas bubbles, but in desired predetermined proportions as well.

Definitions

As used in this specification and claims, the indicated terms have the following meanings:

1. The term "fine gas bubbles" refers to bubbles that have a diameter of no more than approximately 5 mm. (just under $\frac{1}{4}$"), which is the meaning generally given the term in the sewage treatment field. There is as a practical matter no precise line of distinction between fine gas bubbles and coarse gas bubbles, but a rough line of demarcation can be drawn. In this specification and claims, the term "coarse gas bubbles" is used to refer to bubbles that have a diameter of approximately 10 mm. (just over $\frac{3}{8}$") and larger.
2. Any measurement as to "standard cubic feet per minute" is understood to be made at 60° F., 14.696 p.s.i.a., and 760 mm. Hg.
3. The term "stabilized wet permeability" of a given porous material means the amount of air in standard cubic feet per minute that will flow at 70° F. and 25 percent relative humidity through one square foot of a 1" thick piece of the material under 2 inches of water differential pressure, with the air discharging into 48" of water above the porous material. If the porous material is saturated with water at the beginning of the test, then air flow shall continue through the material until all water held by capillary attraction within the porous material is expelled and stabilized flow is established.

As will be seen, the units for the "stabilized wet permeability" of any given porous material are:

Standard cubic feet per minute (scfm)/70° F./25 percent rel. hum./ft.$^2$/1" thick/2" H$_2$0 pressure/into 48 inches of H$_2$0.

To avoid undue complications, whenever this parameter is referred to in the present specification and claims, its units will be omitted, and the value for the stabilized wet permeability of a given porous material will be expressed simply as a numerical figure, with the units understood.

The definition of "standard cubic feet per minute" given above is the accepted standard definition of that term. The definition of "stabilized wet permeability" is consistent with the accepted standard definition of "stabilized dry permeability," revised to reflect the fact that when the parameter of wet permeability is being determined, the air being measured flows through the porous material into water.

Summary Of Structure Of Diffuser Of This Invention

In its broadest form, the gas diffuser of this invention comprises a chamber that forms a gas plenum and includes:

1. A top wall at least a substantial portion of which is formed of a porous material having a stabilized wet permeability of a magnitude to cause the production of fine gas bubbles;
2. Side walls defining, at a predetermined level below said top wall, a plurality of gas outlet openings of a first predetermined size to produce coarse gas bubbles; and
3. A gas inlet opening, preferably at a level below the porous top wall and above the plurality of coarse bubble outlet openings.

When gas is introduced into the gas plenum chamber through the gas inlet opening, it will fill at least the upper portion of the plenum and from there exit through the porous top wall to form fine gas bubbles in the body of liquid in which the diffuser is submerged. When gas is introduced at a higher pressure, it will be discharged from the plenum simultaneously (1) through the porous top wall to form fine gas bubbles, and (2) through the plurality of outlet openings below the level of the gas inlet opening to produce coarse gas bubbles.

One embodiment of the diffuser of this invention includes a bottom wall spaced below the side walls of the gas plenum chamber to form a plurality of horizontal slots large enough to avoid clogging during an indefinite period under ordinary conditions of use. In this embodiment, if the permeable top wall and the side wall gas outlet openings become clogged after an extended period of diffuser use, the horizontal slots at the bottom of the plenum chamber will remain open for an indefinite time under any ordinary conditions of use.

Control Of Two Factors Achieves Desired Mix Of Fine And Coarse Bubbles

It will be seen that applicant has made possible the production of various mixes of fine gas bubbles and coarse gas bubbles from the same gas plenum by controlling two parameters that affect the quantities of each size of bubbles produced by the diffuser of this invention:

(1) The pore size or permeability of the top wall of the gas plenum chamber; and
(2) The differential pressure to which the top wall of the gas plenum chamber, through which gas flows out of the gas plenum, is subjected.

The first of these two parameters is determined by the selection of the pore size, outlet opening size, or stabilized wet permeability (as defined above) of the porous material in the top wall of the gas plenum chamber. The second is determined—since the water level in the gas plenum chamber must drop to the level of the gas outlet openings for coarse gas bubbles before any of the pressurized gas can flow out through those coarse bubble openings—by the distance below the porous top wall of the plenum chamber that those gas outlet openings are located.

Other parameters in the construction of the gas diffuser of this invention that affect the proportions of fine and coarse bubbles of which the diffuser is capable include (1) the area of the top wall of the gas plenum chamber that is comprised of porous material, (2) the size of the side wall gas outlet openings, and (3) the number of such openings. In addition, the mix of fine and coarse bubbles produced by the diffuser is affected, as will be discussed below, by the interaction between the level of the side wall gas outlet openings and the pressure at which the gas is introduced into the gas plenum chamber during operation of the diffuser.

Permeability Of Porous Top Wall

Satisfactory results are obtained with the gas diffuser of this invention that includes a top wall for the gas plenum chamber formed of a porous material having a stabilized wet permeability of not more than about 5. Improved results are obtained with a stabilized wet permeability of more than about 10 but less than about 35. Still further improved results are obtained with a stabilized wet permeability range of about 5 to about 10, with the preferred value being about 7.5. As already explained above, to determine these parameters the results achieved by use of the diffuser of this invention are evaluated in terms of the level of production of fine gas bubbles and the level of the simultaneous production of some larger bubbles.

BRIEF DESCRIPTION OF THE DRAWING

This invention will be described by reference to the accompanying drawing, in which:

FIG. 1 is a plan view of a gas diffuser comprising one embodiment of the apparatus of this invention, with a portion of a gas supply pipe shown connected therewith;

FIG. 2 is a sectional view of the embodiment of FIG. 1, taken along the line 2—2 in that Figure; and FIG. 3 is a fragmentary sectional view of another embodiment of the apparatus of this invention.

DETAILED DESCRIPTION OF TWO EMBODIMENTS OF THIS INVENTION

The Structure Of The Diffuser

FIG. 1 is a plan view of gas diffuser 10 of this invention submerged in a body of transparent liquid 12. Diffuser body or chamber 14 has a central inlet opening 16 at its lower end and a larger outlet opening 18 at its upper end. Porous member 20, which is constructed so that when gas diffuser 10 is submerged in body of receiving liquid 12 the upper surface of member 20 will be horizontal throughout its area, closes outlet opening 18 with an airtight fit.

Chamber 14 forms gas plenum 22. The chamber includes porous top wall 20, side walls 24, and bottom wall 26 (the latter best seen in FIG. 2).

As seen in FIG. 2 (which is a cross sectional view taken along line 2—2 in FIG. 1), except for sealant 28, all of top wall 20 is formed of a porous material having a stabilized wet permeability of a magnitude to cause the production of fine gas bubbles in body of liquid 12 when gas under pressure is introduced into plenum 22 through central inlet opening 16.

As seen from all three Figures of the drawing, both because of the thickness of side walls 24 and because of sealant 28 (when the latter is present), the porous portion of top wall 20 is spaced inwardly throughout its perimeter from the exterior surface of the side walls of the plenum chamber.

Gas inlet stem 30 is positioned within chamber 14 in fluid communication with central opening 16. The upper end 36 of stem 30 forms the gas inlet opening into gas plenum 22.

Side walls 24 define, at a predetermined distance $d_1$ below top wall 20, a plurality of gas outlet openings 32. In the embodiment shown, gas plenum chamber 14 has an over-all diameter of approximately 6", and gas outlet openings 32 have a diameter of approximately ⅛".

The size of gas outlet openings 32 is selected to produce coarse gas bubbles when gas is introduced into gas plenum 22 at a pressure that is great enough to force the level of liquid within the gas plenum down a distance greater than distance $d_1$ below top wall 20. This level is indicated in phantom in FIG. 2. With the liquid within gas plenum 22 at this level, gas can exit through openings 32 and be discharged into body of liquid 12.

As will be seen from FIGS. 1 and 2, outlet openings 32 are of a predetermined, fixed size, and are substantially equally spaced around the perimeter of the chamber. They are unobstructed at all times except for any deposit that may be built up in the openings during use of the diffuser.

In the embodiment shown, side walls 24 of gas plenum chamber 14 define a second plurality of gas outlet openings 34 that are larger than gas outlet openings 32. Openings 34 are positioned at distance $d_2$ below top wall 20, which is at a level below the level of outlet opening 32.

The gas diffuser of this invention can be used to advantage without the second level of gas outlet openings 34, but with those openings some flexibility in coarse bubble size is provided, and the length of time the gas diffuser can be used before the gas outlet openings in side walls 24 become clogged is extended because of the larger size of openings 34. In the embodiment shown, each opening 34 has a diameter of approximately ⅜".

As will be seen from FIG. 2, in this embodiment gas inlet opening 36 at the upper end of stem 30 is located at a level below porous top wall 20 and above coarse bubble outlet openings 32 and 34.

Gas supply pipe 40 is positioned below gas diffuser 10. Gas plenum chamber 14 is supported on supply pipe 40 by diffuser saddle 42.

The supply pipe has an inlet end 44 for introduction of gas to be piped to and into gas plenum 22. The remote end of supply pipe 40 is connected to a source (not shown) of the gas that is to be diffused into the body of liquid being treated.

Combination diffuser inlet tube and supply pipe drainer stem 46 extends generally vertically downward from central inlet opening 16 into supply pipe 40 (FIG. 2). Its lower inlet end 48 extends to a location adjacent but spaced from bottom wall 50 of supply pipe 40. Member 46 has a dual function—introduction of gas into diffuser 10 and discharge of unwanted liquid from supply pipe 40 when the diffuser is started up after an inactive period during which liquid has entered plenum 22 and the interior of supply pipe 40. The operation of member 46 is explained in commonly assigned co-pending application Ser. No. 638,776 entitled "Gas Diffuser And Accompanying Piping System."

In the embodiment shown, bottom wall 26 of gas plenum chamber 14 is spaced below side walls 24 to form a plurality of horizontal slots 52. Slots 52 provide outlet openings between bottom wall 26 and side walls 24 that are large enough to avoid clogging during an indefinite period under ordinary conditions of use. As seen, four spacer members 54 and associated bolts 56 support bottom wall 26 on side walls 24 to form the slots.

In this embodiment, slots 52 are approximately ⅛" wide and approximately 4" long. As a result, the slots extend throughout a substantial portion of the perimeter of side walls 24. As in the case of gas outlet openings 32 and 34, the approximate level below which the liquid within gas plenum chamber 14 is pushed down by pressurized gas within plenum 22 to permit gas to exit from the plenum through slots 52 is shown at distance $d_3$ below top wall 20.

FIG. 3 shows porous top wall 60 of gas plenum chamber 14. As with the embodiment of FIGS. 1 and 2, the porous top wall is connected through sealant 62 with side walls 14 to form an airtight seal.

In this embodiment, top wall 60 is formed of a tightly woven wire screen material.

Operation Of Gas Diffuser Of This Invention

To sum up, the use of the gas diffuser of this invention makes possible the simultaneous production of desired proportions of both fine and coarse gas bubbles from a single gas plenum, and in one form permits operation of the diffuser to provide large, irregularly shaped quantities of gas (which in the vernacular might be referred to as ("blurps" of gas) for an indefinite period of time after all smaller gas outlet openings have become completely clogged.

As has been pointed out, the degree of permeability of the porous top wall of the gas plenum chamber determines the size of the fine gas bubbles that are produced by the diffuser and the size of the gas outlet openings in the chamber side walls determines the size of the coarse gas bubbles produced—until the porous material of the top wall and the side wall outlet openings become clogged through extended diffuser use.

The proportions of fine gas bubbles and coarse gas bubbles that are produced are determined by the parameters discussed above—the degree of permeability and area of the porous top wall, and the vertical level, size and number of the coarse bubble openings in the side walls—as affected by the gas pressure that is maintained in the gas plenum chamber.

The horizontal slots at the bottom of the gas plenum chamber of the diffuser of this invention are selected to be sufficiently large that there will never be clogging of these slots under any ordinary conditions of use.

As mentioned above, satisfactory results are obtained with the gas diffuser of this invention as described above and shown in the drawing using a porous material having a stabilized wet permeability of less than about 5. With porous materials falling in this range, a small volume of air will flow through the porous material at the top of the gas plenum chamber to create fine bubbles of 3 mm. or less in diameter, and a large volume of air will flow through the ¼" diameter and ⅜" diameter holes on the side walls of the diffuser. The large volume of air exiting through the ¼" and ⅜" diameter holes will create large irregularly shaped bubbles having a minimum dimension of approximately ⅜" to 1", depending on header supply pressure. In the event that the porous material and the holes become plugged completely, air will begin—and continue indefinitely—to exit in extremely large, irregularly shaped quantities of air (which as suggested above might be referred to as "blurps" of air) through the horizontal slots at the bottom of the gas plenum chamber of the diffuser.

Improved results are obtained with a porous material in the top wall of the gas plenum chamber having a stabilized wet permeability of more than about 10 and less than about 35. Within this range of permeabilities, the air will initially flow through the top porous material and will produce medium size bubbles in the range of 3 to 10 mm. In the event that the pressure at which gas is introduced into the gas plenum chamber is increased sufficiently, or in the event that enough plugging or fouling of the porous material occurs, the pressure drop across the porous material will increase to such a point that air flow will commence through the side wall holes as well as through the top porous material. Complete plugging of the top porous material and the side wall holes will cause air flow to begin—and continue indefinitely—through the slots at the bottom of the plenum chamber of the diffuser.

Still further improved results are obtained with a stabilized wet permeability range of about 5 to about 10, with the preferred value being about 7.5. At a stabilized wet permeability of 7.5, the diffuser can easily be controlled to produce simultaneously approximately 3 mm. nominal diameter bubbles from the porous material and $\frac{3}{8}''$ to 1" minimum dimension bubbles from the holes in the diffuser side walls. With $d_1$ equal to $4\frac{1}{2}''$ and $d_2$ equal to 5", controlling the diffuser plenum pressure to less than $4\frac{1}{2}''$ of water causes air to flow through the top porous material only. Plenum pressures of $4\frac{1}{2}''$ to 5" in water causes air to flow through the top porous material and the $\frac{1}{4}''$ diameter side wall holes. Plenum pressure greater than 5" of water causes air to flow through the top porous material, and through the $\frac{1}{4}''$ diameter and the $\frac{3}{8}''$ diameter side wall holes as well. In the event that the porous material and the side wall holes are plugged completely or the plenum pressure is increased to $5\frac{3}{4}''$, air will begin—and continue indefinitely—to flow through the horizontal slots at the bottom of the plenum chamber of the diffuser.

EXAMPLE

The following types of air bubble flow—described in terms of flow location, flow rate in scfh, and bubble size—are obtained at the indicated operating pressures using a gas diffuser of the type shown and described in this specification, with (1) a circular top wall approximately 6" in diameter having a stabilized wet permeability of 7.5 and side walls having (2) an upper row of eight equally spaced $\frac{1}{4}''$ holes located approximately $4\frac{1}{2}''$ below the top wall, (3) a lower row of equally spaced $\frac{3}{8}''$ holes, located approximately 5" below the top wall, and (4) four horizontal slots $\frac{1}{2}''$ wide and approximately 4" long at the bottom of the gas plenum chamber:

| Air Plenum Pressure In Inches Of Water | Flow Location | Diffuser Flow In Standard Cubic Feet/Hour | Bubble Size - Minimum Dimension |
|---|---|---|---|
| 1" | No flow | 0 | 0 |
| 2" | Porous material | 2.4 | approx. 3 mm. |
| 3" | Porous material | 20 | 3 to 4 mm. |
| 4" | Porous material | 70 | 3 to 5 mm. |
| $4\frac{1}{2}''$ | Porous material $\frac{1}{4}''$ diameter holes | 165* | 3 to 5 mm. $\frac{3}{8}''$ to $\frac{1}{2}''$ |
| 5" | Porous material $\frac{1}{4}''$ diameter holes $\frac{3}{8}''$ diameter holes | 350* | 3 to 5 mm. $\frac{3}{8}''$ to $\frac{1}{2}''$ $\frac{1}{4}''$ to 1" |

*Combined flow

The above detailed description has been given for clarity of understanding only. No unnecessary limitations should be understood therefrom, as modifications will be obvious to those skilled in the art.

I claim:

1. A gas diffuser for diffusing gas into a body of receiving liquid in which the diffuser is submerged, which comprises a chamber that forms a gas plenum, said chamber including:
   (a) a top wall at least a substantial portion of which is formed of a porous material having a stabilized wet permeability of a magnitude to cause the production of fine gas bubbles when gas is introduced under a first predetermined pressure into said gas plenum chamber and exits through said porous top wall;
   (b) side walls defining, at a predetermined level below said top wall, a plurality of gas outlet openings of a first predetermined, fixed size to produce coarse gas bubbles when gas is introduced under a second, higher predetermined pressure into said gas plenum chamber and exits through said gas outlet openings, while continuing at all times to exit simultaneously through said porous top wall and through said gas outlet openings in said side walls, said gas outlet openings being unobstructed at all times except for any deposit that may be built up in said openings during use of said diffuser, said unobstructed gas outlet openings in the side walls of said plenum chamber being substantially equally spaced around the perimeter of the chamber; and
   (c) a gas inlet opening,
   whereby gas introduced under said first predetermined pressure into said gas inlet opening:
   will fill the upper portion of said gas plenum and exit through said porous top wall of the plenum chamber to form a rising central cylindrical column of densely packed fine gas bubbles in the body of receiving liquid in which the diffuser is submerged, and
   if the pressure at which the gas is maintained in said plenum is increased to said second predetermined figure, will fill said plenum chamber down to said predetermined level of said plurality of coarse bubble outlet openings and exit through said openings to form a rising outer, hollow, cylindrical sheath of coarse gas bubbles in the body of receiving liquid in which the diffuser is submerged, while said column of fine gas bubbles continues to be discharged through said porous top wall of the plenum chamber.

2. The gas diffuser of claim 1 in which said plenum chamber has a central opening adjacent the bottom of the chamber, and a gas inlet stem positioned within said chamber is in fluid communication with said central opening, with the upper end of said stem forming said gas inlet opening into said gas plenum.

3. The gas diffuser of claim 1 in which said gas plenum chamber includes a bottom wall spaced below said side walls of the chamber to form a plurality of horizontal slots that provide outlet openings between said bottom wall and said side walls large enough to avoid clogging during an indefinite period under ordinary conditions of use, said slots extending throughout a substantial portion of the perimeter of said side walls, whereby, if the porous top wall and all said gas outlet openings in said side walls become completely clogged, gas introduced into said plenum chamber at any pressure will fill the entire plenum and exit through said horizontal slots.

4. The gas diffuser of claim 1 which produces fine gas bubbles and coarse gas bubbles in predetermined proportions by gas flow rate, in which:
   (a) the portion of said top wall of the plenum chamber that is formed of said porous material has a stabilized wet permeability and a surface area of a magnitude to produce a first predetermined flow rate of fine gas bubbles when gas is introduced into said plenum chamber at the aforesaid first predetermined pressure, and a second predetermined flow rate of fine gas bubbles when gas is introduced at said second predetermined pressure;

(b) said gas outlet openings of a first predetermined size in the plenum chamber side walls are provided in a number to produce a predetermined flow rate of coarse gas bubbles when gas is introduced into said plenum chamber at said second predetermined pressure, said second flow rate of fine gas bubbles and said flow rate of coarse gas bubbles having said predetermined proportions; and (c) said plurality of openings of a first predetermined size is located at a level that permits the quantity of pressurized gas in said plenum to increase, as the pressure at which the gas is introduced into the plenum is increased from said first to said second predetermined pressure, until it causes a pressure drop across said porous top wall of a magnitude to produce said predetermined proportion by flow rate of fine gas bubbles, while the pressure of the gas in said plenum chamber is maintained at the aforesaid second predetermined pressure to produce ssaid predetermined proportion by flow rate of coarse bubbles.

5. The gas diffuser of claim 1 in which said porous material of said top wall of said gas plenum chamber has a stabilized wet permeability of no more than about 35.

6. The gas diffuser of claim 1 in which said porous material of said top wall of said gas plenum chamber has a stabilized wet permeability of no more than about 5.

7. The gas diffuser of claim 1 in which said porous material of said top wall of said gas plenum chamber has a stabilized wet permeability of more than about 10 but less than about 35.

8. The gas diffuser of claim 1 in which said porous material of said top wall of said gas plenum chamber has a stabilized wet permeability of from about 5 to about 10.

9. The gas diffuser of claim 1 in which said porous material of said top wall of said gas plenum chamber has a stabilized wet permeability of about 7.5.

10. The gas diffuser of claim 1 in which said gas inlet opening is located at a level below said porous top wall and above said plurality of coarse bubble outlet openings.

11. The gas diffuser of claim 1 in which the upper surface of said porous portion of said plenum chamber top wall is constructed so as to be horizontal throughout its area when said diffuser is submerged in said body of receiving liquid.

12. The gas diffuser of claim 1 in which the porous portion of said plenum chamber top wall is inwardly spaced throughout its perimeter from the exterior surface of said side walls of the plenum chamber.

* * * * *